Figure 5:
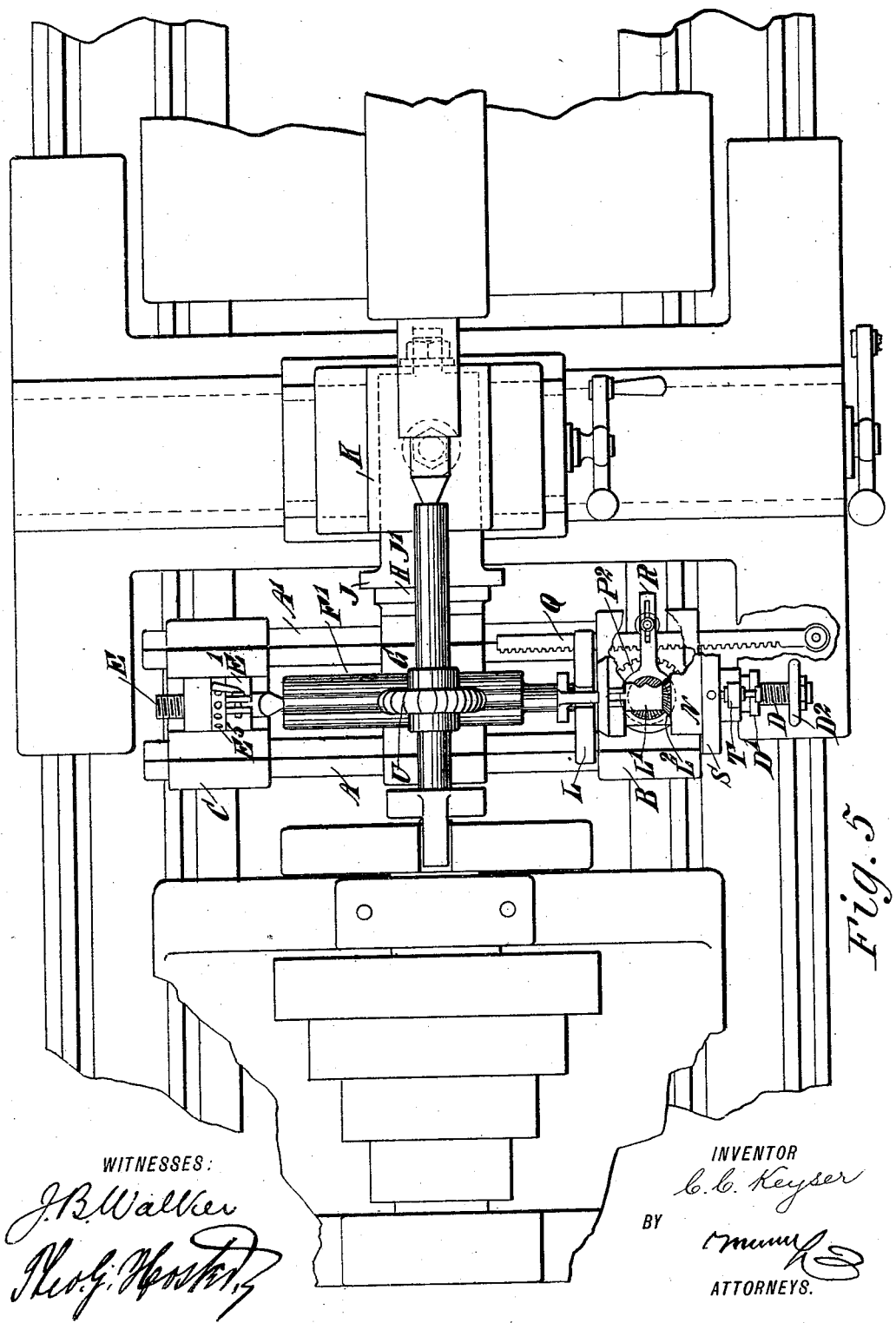

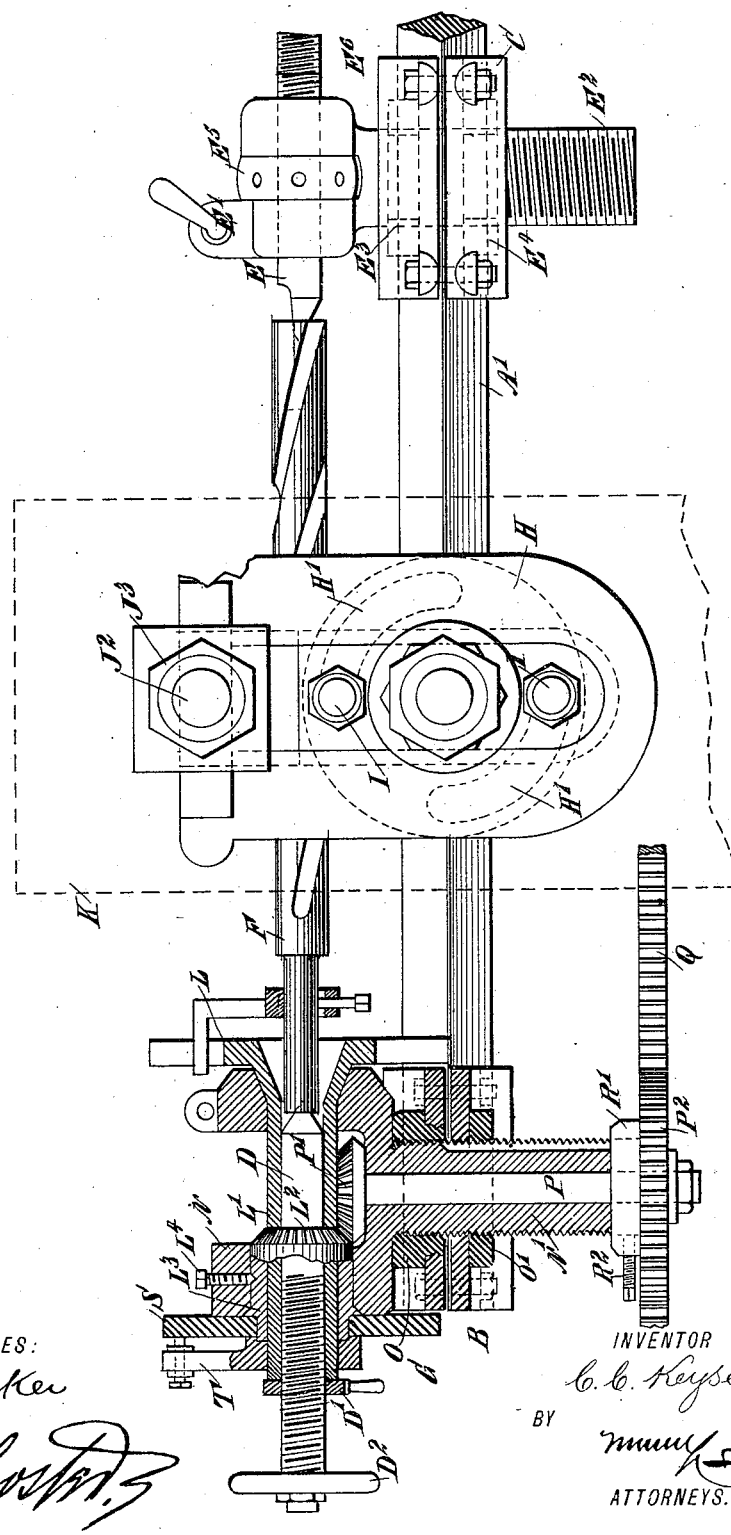

(No Model.) 3 Sheets—Sheet 2.
C. C. KEYSER.
MILLING ATTACHMENT FOR LATHES.
No. 565,277. Patented Aug. 4, 1896.
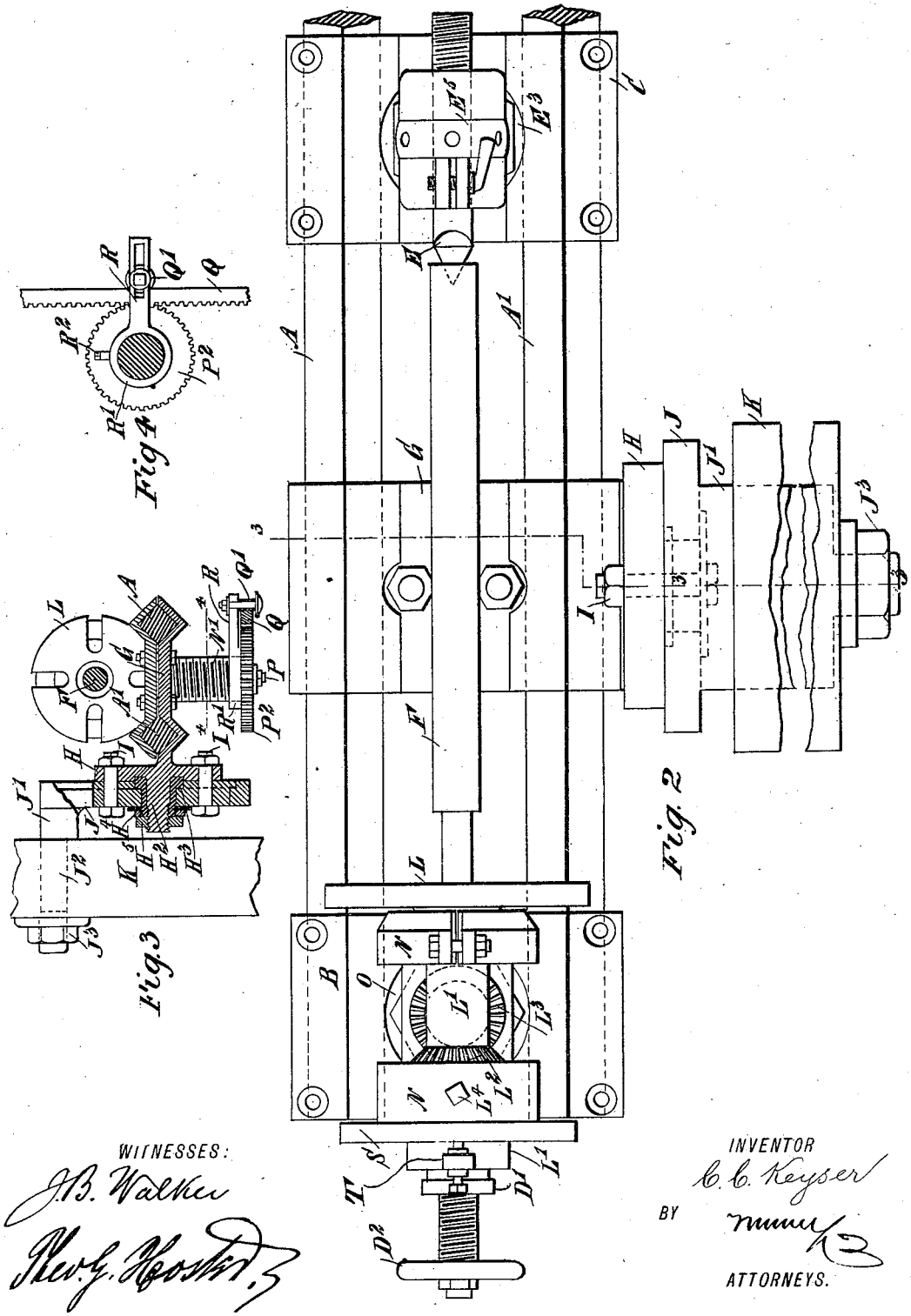

(No Model.) 3 Sheets—Sheet 3.
C. C. KEYSER.
MILLING ATTACHMENT FOR LATHES.

No. 565,277. Patented Aug. 4, 1896.

WITNESSES:
J. B. Walker
Theo. G. Hoster

INVENTOR
C. C. Keyser
BY
ATTORNEYS.

UNITED STATES PATENT OFFICE.

CHARLES CLANTON KEYSER, OF NEW DECATUR, ALABAMA.

MILLING ATTACHMENT FOR LATHES.

SPECIFICATION forming part of Letters Patent No. 565,277, dated August 4, 1896.

Application filed January 14, 1896. Serial No. 575,418. (No model.)

*To all whom it may concern:*

Be it known that I, CHARLES CLANTON KEYSER, of New Decatur, in the county of Morgan and State of Alabama, have invented a new and Improved Milling Attachment for Lathes, of which the following is a full, clear, and exact description.

The object of the invention is to provide a new and improved milling attachment for lathes which is simple and durable in construction, quickly attached to the lathe, and arranged for producing all kinds of work that is usually done on all high-grade milling-machines.

The invention consists principally of a frame adapted to be attached to the lathe in place of the tool-post, a live-center mounted to be turned in the head-stock of the frame, and a dead-center adjustably held in a tail-stock of the frame.

The invention also consists of certain parts and details and combinations of the same, as will be fully described hereinafter and then pointed out in the claims.

Reference is to be had to the accompanying drawings, forming a part of this specification, in which similar characters of reference indicate corresponding parts in all the figures.

Figure 1 is a side elevation of the improvement with parts in section. Fig. 2 is a plan view of the same. Fig. 3 is a reduced transverse section of the same on the line 3 3 of Fig. 2. Fig. 4 is a sectional plan view of the same on the line 4 4 of Fig. 3; and Fig. 5 is a plan view of the improvement as applied and showing the device arranged for straight milling.

The improved milling attachment is provided with a frame having two parallel bars or shears A A', carrying at their ends the clamps B and C, of which the clamp B supports a vertically-adjustable head-stock for the live-center D, and the other clamp carries a vertically-adjustable tail-stock E, carrying the dead-center E, which, with the live-center D, supports the work F to be milled. Between the clamps B and C is held adjustable on the shears A A' a third clamp G, formed at its forward end with a disk H, having segmental slots H', engaged by bolts I, secured in a depending arm J, formed at its upper end with a transversely-extending shaft J', having the reduced part $J^2$, engaging the slot in the lathe slide-rest K usually occupied by the tool-post. The shaft J' is secured in the tool-post by a nut $J^3$, screwing on the outer threaded end of the reduced part $J^2$. (See Fig. 3.)

In the center of the disk H is formed a forwardly-extending stud $H^2$, passing through a sleeve $H^3$, held in the arm J and adapted to be secured thereto by a nut $H^4$, said sleeve and nut being covered at their outer ends by a nut $H^5$, screwing on the outer threaded end of the stud $H^2$. This sleeve $H^3$ and its nut $H^4$ serve to set the disk H to any desired angle on the arm J, whereby the shears A A' and the part supported thereon are likewise moved into their desired angle. Now it will be seen that by this arrangement the shears A A' are supported from the slide-rest K and can be set at any desired angle to bring the work F in the proper position relatively to the milling, according to the work to be done.

The live-center D is mounted for longitudinal adjustment in a hollow spindle L', carrying at its forward end the face-plate L, connected in the usual manner by a dog with the work F. The face-plate has a square-tapered socket for work with a square on the end, as drills for ratchets, &c. On the outer threaded end of the live-center D screws the handled nut D', adapted to abut against the outer end of the hollow spindle L' to secure the center in position. The center is turned by a handle or wheel $D^2$ on the extreme outer end of the center. The hollow spindle is mounted to turn in the head-stock N, formed at its bottom with a hollow threaded extension N' screwing into a nut O, held in the middle of the clamp B to permit of raising and lowering the head-stock according to the work under treatment. A jam-nut O' screws on the extension N' to engage the under side of the clamp B and fasten the said head-stock in place after it is adjusted to the proper height.

The outer end of the hollow spindle L' turns in the hub $L^3$ of a gear-wheel $L^2$, in mesh with a beveled gear-wheel P', secured on the upper end of a shaft P, journaled in the extension N' of the head-stock; and on the lower end of this shaft P is secured a gear-wheel $P^2$ in mesh with a rack Q, pivoted to the lathe-carriage or other movable part of the lathe, (see Fig. 5,) so as to impart a rotary motion to the said gear-wheel P², the shaft P, and beveled gear-wheel P', which, by the beveled gear-wheel L², turns the spindle L', and consequently the work F, whenever flutes or spirals are to be cut on the work F. In case the work F is simply to be milled, then the rack Q is thrown out of engagement with the gear-wheel P², it being understood that the said rack Q is supported and held in mesh with the gear-wheel P² by a friction-roller Q', held on an arm R, fitting with its hub R' on the extension N', and secured thereon by a set-screw R².

On the outer end of the hub-spindle L³ for the gear-wheel L² is secured an index-plate S, engaged by the usual index-arm T, secured on the outer end of the hollow spindle L'. By this arrangement the spindle L', and consequently the dog L and the work F, can be turned when cutting gear-wheels or other work divided into a desired number of parts.

The tail-stock E', carrying the dead-center E, is provided with a downwardly-extending threaded spindle E², screwing in a nut E³, held on the top of the clamp C, so as to permit of adjusting the tail-stock E' vertically to bring the dead-center E in engagement with the live-center D after the latter is adjusted vertically on the clamp B, as previously described. A jam-nut E⁴, screwing on the spindle E² and engaging the under side of the clamp C, is adapted to fasten the tail-stock in place after it is vertically adjusted.

The tail-stock E' is preferably forked at its upper end, and between the forks is arranged a nut E⁵, in which screws the dead-center E, the latter being moved longitudinally by the operator turning the nut E⁵ with a suitable tool inserted in one of the peripheral recesses in the said nut. A milling-tool U is carried by the lathe-spindle between the lathe-centers, as shown in Fig. 5, and as the attachment can be adjusted in any desired direction from the slide-rest K, I am enabled to bring the said milling-tool into any desired position relative to the work.

It is understood that when the work is held stationary and longitudinal flutes only are cut therein, (see Fig. 5,) or gear-wheels are formed, then the hub L³ of the gear-wheel L² is secured in place in the head-stock N' by a set-screw L⁴, and consequently the index-plate S is stationary; but when it is desired to cut spiral grooves or flutes, then the set-screw L⁴ is unscrewed and the gear-wheel hub L³ is free to turn in the head-stock N, so that when the shaft P is rotated, as previously described, then the rotary motion given to the gear-wheel L² and its hub L³ is transmitted by the index-plate S and arm T to the hollow spindle L'.

Having thus fully described my invention, I claim as new and desire to secure by Letters Patent—

1. A milling attachment for lathes, comprising an arm adapted to be attached to the slide-rest of the lathe, a disk mounted to turn on said arm and adapted to be secured thereto, a clamp supported on said disk, shears held in said clamp, a head-stock supported on said shears, and a tail-stock supported on said shears, substantially as shown and described.

2. A milling attachment for lathes, comprising an arm adapted to be attached to the slide-rest of the lathe, a disk mounted to turn on said arm and adapted to be secured thereto, a clamp supported on said disk, shears held in said clamp, a head-stock supported on said shears, a tail-stock supported on said shears, and means for vertically adjusting said head-stock and tail-stock, substantially as shown and described.

3. A milling attachment for lathes, comprising a vertically-adjustable head-stock, a spindle journaled in said head-stock and provided with a face-plate, an index-arm held on said spindle, an index-plate engaged by the said index-arm, a gear-wheel carrying on its hub the said index-plate, a second gear-wheel in mesh with the said first-named gear-wheel, a shaft mounted in said head-stock, and means for imparting a turning motion to said shaft, substantially as shown and described.

4. A milling attachment for lathes, comprising a vertically-adjustable head-stock, a spindle journaled in said head-stock and provided with a face-plate, an index-arm held on said spindle, an index-plate engaged by the said index-arm, a gear-wheel carrying on its hub the said index-plate, a second gear-wheel in mesh with the said first-named gear-wheel, a shaft mounted in said head-stock, means for imparting a turning motion to said shaft, and a live-center held longitudinally adjustable in said spindle, as set forth.

5. A milling attachment, comprising a frame adapted for attachment to a lathe slide-rest or the like, clamps carried on the frame and adjustable longitudinally of the frame, head, and tail stocks carried on the clamps and adjustable toward and from the frame, and centering devices carried by the head and tail stocks, substantially as set forth.

6. A milling attachment, comprising a frame adapted for pivotal connection with a lathe slide-rest or the like, head and tail stocks carried on the frame on opposite sides of the pivotal center thereof, and adjustable toward and from the frame, a shaft mounted to turn in the head-stock, a live-center also mounted to turn in the head-stock and having means for driving it from said shaft, a centering device carried by the tail-stock, and means for driving said shaft from a moving part of the lathe to which the attachment is applied, substantially as set forth.

7. A milling attachment comprising a frame adapted for connection with a lathe slide-rest or the like, head and tail stocks carried on the frame on opposite sides of the center thereof and adjustable toward and from each other, a shaft mounted to turn in the head-stock, a live-center also mounted to turn in the head-stock and driven from the said shaft, a centering device carried by the tail-stock, a rack actuated from a moving part of the lathe, and a gear-wheel on the shaft meshing with the rack, substantially as described.

8. A milling attachment comprising a frame adapted for connection with a lathe slide-rest or the like, head and tail stocks carried on the frame on opposite sides of the center thereof and adjustable toward and from each other, a shaft mounted to turn in the head-stock and having a gear-wheel, a live-center mounted to turn in the head-stock and driven from the said shaft, a centering device carried by the tail-stock, and a rack pivotally connected to a moving part of the lathe and engaging the gear-wheel on the shaft, substantially as described.

9. A milling attachment comprising a frame adapted for connection with a lathe slide-rest or the like, clamps carried on the frame on opposite sides of the center thereof and adapted to be adjusted toward and from each other, a head-stock screwing in one clamp and a tail-stock carried by the other clamp, a shaft mounted to turn in the head-stock and having a gear-wheel, a live-center mounted to turn in the head-stock and driven from said shaft, a centering device carried by the tail-stock and a rack connected to a moving part of the lathe and meshing with the gear-wheel on said shaft, substantially as described.

CHARLES CLANTON KEYSER.

Witnesses:
N. W. CALKINS,
C. E. SAYWELL.